Patented Dec. 27, 1938

2,141,569

UNITED STATES PATENT OFFICE 2,141,569

CONCRETE AND HYDRAULIC CEMENT

George R. Tucker, North Andover, Mass.; Charles W. Tucker, administrator of said George R. Tucker, deceased, assignor to Dewey and Almy Chemical Company, Cambridge, Mass., a corporation of Massachusetts No Drawing. Application November 21, 1932, Serial No. 643,740

35 Claims. (Cl. 106—27)

This invention relates to concrete and the hydraulic cement from which it is prepared, and comprises the introduction into the concrete or cement of a small quantity of an agent capable of permitting a reduction in mixing water without diminution in plasticity and of providing an increase in the strength of the hardened concrete, all as more fully hereinafter described and claimed.

The properties of hydraulic (e. g. ordinary Portland) cement and the concrete made therefrom have been thoroughly investigated by chemists and engineers during the last twenty years; and their conclusions are epitomized in what is spoken of as the water-cement ratio law. This law has been published by the Portland Cement Association as follows:

"For plastic mixtures, using sound and clean aggregates, the strength and other desirable properties of concrete under given job conditions are governed by the net quantity of mixing water used per sack of cement."

The term "plastic mixtures" describes a concrete that is neither so wet that the mix segregates in handling, nor so dry that it can not be properly compacted. As a corollary of the above mentioned law, it may be stated that the compressive strength and other desirable properties of the finished concrete are independent of the amount of aggregates employed in the plastic mixture and depend upon the amount of water per sack of cement which must be used to produce a mass of workable fluidity or plasticity. It follows, therefore, that any means which is effective to decrease the ratio of water to cement without at the same time decreasing the plasticity below a workable limit or exerting an otherwise adverse influence on the material will produce a more desirable concrete.

The plasticity of wet concrete is commonly measured by the well known "slump test"; and when I refer herein to a concrete as having greater plasticity or fluidity than another, I means that it displays a greater slump according to this test.

An object of this invention is to increase the plasticity of a given mixture of cement, water, and aggregates without adversely affecting the compressive strength of the hardened material or detracting from other desirable qualities. Another object is to increase the compressive strength afforded by any specified mixture of cement and aggregates prepared with the necessary quantity of mixing water to yield any assigned plasticity. Still another object is to afford a larger volume of finished concrete of designated plasticity in the wet condition and strength in the hardened state than could heretofore be obtained from a unit weight of hydraulic cement. Other objects are to produce concretes which are more dense, more durable, and more waterproof than have heretofore been obtainable.

I have discovered that when small amounts of certain substances, which will be described more fully hereinafter, are added to hydraulic cement or to the mix of concrete made therefrom, the quality of the concrete is improved in the respects above mentioned and in other respects as will become apparent as the description proceeds. My invention in its broader aspects is based on the discovery that there are certain substances which when present in a concrete mix appear, in some as yet not fully understood manner, to bring about a more uniform distribution of the cement particles throughout their water-aggregate environment without at the same time in any way adversely affecting the reactions and physical relationships that are brought about within the cement itself or between the cement and the associated aggregates during the hardening of the concrete. The most plausible explanation of the effectiveness of the substances under consideration for the purposes in question is that they act by dispersing or peptizing the individual cement particles in the aqueous medium thereof, that a higher ultimate compressive strength is a direct result of a larger number of cement particles available as nuclei for the net- or gel-like structure which hardened concrete is believed to possess, and that the increased rate of development of compressive strength is a consequence of increased cement surfaces available for hydration, the process by which concrete hardens.

Substances that I have found effective for the purposes of the present invention are soluble salts or derivatives (or even the free sulfonic acids) of sulfonic acids chosen from a certain class of aromatic sulfonic acids. This class broadly embraces the sulfonic acid compounds that have a chemical structure characterized by a plurality of aromatic nuclei joined to an aliphatic nucleus and may be expressed by the general graphical formula $(A-R-A')SO_3M$ in which A and A' designate two or more aromatic groups, which may or may not be alike, which are joined to an aliphatic nucleus R which may consist of a single alkyl group, or a plurality of alkyl groups associated in straight chain or branched chain formation; and in which $SO_3M$ designates at least one solubilizing group such as the free sulfonic acid group or a sulfonic acid group in combination with a soluble salt-forming radical. The members of the class may be synthesized either by direct sulfonation of a hydrocarbon or a derivative thereof which possesses the necessary configuration of at least two aromatic nuclei joined to an aliphatic nucleus, or, as is usually more convenient and commercially practical, by causing an aromatic sulfonic acid to react with formaldehyde or its equivalent, preferably in the ratio of approximately two mols of aromatic sulfonic acid for each mol of aldehyde. Substances that are particularly effective for the present purposes may be obtained by condensing sulfonic acids of naphthalene, its homologues or derivatives, with formaldehyde or its equivalents. The resulting compounds are believed to be derivatives of dinaphthyl methane or its homolgues. The member of the family which I have employed because it is cheap and very effective for present purposes may be obtained by condensing beta-naphthalene sulfonic acid with formaldehyde; and I find that the following detailed procedure leads to a product which has an optimum effectiveness.

To 100 parts of concentrated sulfuric acid (specific gravity 1.84) contained in a suitable sulfonator and maintained at 160° C. are added slowly with stirring 100 parts of refined naphthalene. After all of the naphthalene has been introduced (this operation generally requires about one hour), the mass is stirred at 160° C. for four hours longer or until a test shows that substantially none of the naphthalene remains unsulfonated. The sulfonation mixture is then cooled to about 100° C. and diluted with 44 parts of water to prevent solidification on subsequent cooling. The diluted material is further cooled to 80° C. at which temperature 12 parts of a 40% aqueous solution of formaldehyde are added. This mixture is then stirred for three hours longer at 80° C.; but at the end of each successive hour there are added 12 parts more of formaldehyde solution, making a total at the end of the three hours of four portions or 48 parts in all. After all the formaldehyde has been added, the temperature is progressively raised over a period of one hour to 95–100° C. where it is maintained for 18 hours, while the mass is constantly stirred, or until a product of optimum effectiveness has been obtained. Experience has shown that when pure naphthalene is used, a final heating period of 18 hours yields the best product. Soon after the temperature has been raised to 95–100° C., it is found that substantially none of the aldehyde remains unconsumed in the condensation reaction. During the later stages of the 18-hour heating period, the mixture progressively thickens until at the end it generally reaches the consistency of thick molasses. If this thickening becomes so great, however, as to prevent proper stirring a small quantity of water may be added to keep the material liquid. After the heating is completed, the mixture is cooled, neutralized with a suitable alkali, e. g. sodium hydroxide, and, if desired, dried. It is then ready for use.

A somewhat purer and better product can be obtained by diluting the viscous reaction mass with about three times its volume of water (the amount is not important so long as it is sufficient to permit convenient handling in the subsequent filtering operation), and neutralizing with lime. For the latter purpose I generally use an aqueous paste or suspension of hydrated or slaked lime. The neutralized slurry is filtered hot to remove the calcium sulfate precipitate which forms from the interaction of the lime and sulfuric acid unconsumed in the sulfonation reaction; and to the filtrate is added the requisite amount of sodium carbonate quantitatively to convert the calcium salt of the desired sulfonic acid into its sodium salt. The resulting calcium carbonate precipitate may then be removed by filtration and the filtrate which contains the desired ingredient evaporated to dryness according to any of the well known drying procedures.

The sulfonation of the naphthalene may be conducted in a cast iron vessel; but the reaction with formaldehyde is preferably carried out in enameled or lead-lined apparatus. It is my theory that in the chemical reaction which occurs between an aromatic sulfonic acid and formaldehyde the initial condensation reaction is followed by a progressive polymerization of the resulting condensed material, and that a certain optimum molecular weight is most desirable for present purposes. In other words, I find that the best results are obtained when the beta-naphthalene sulfonic acid condensation product has been subjected to a controlled polymerization treatment.

In similar manner, compounds suitable for the purposes of this invention may be obtained by substituting for naphthalene sulfonic acid in the condensation reaction other aromatic sulfonic acids such as those which may be derived from benzene, diphenyl, phenanthrene, anthracene, etc., or their homologues, or derivatives. Products derived from the benzene series are less effective, however, than materials derived from polynuclear aromatic hydrocarbons or their derivatives. Alkylated aromatic compounds such, for example, as afforded by the sulfonic acids of xylene, cumene, ethyl naphthalene, or retene generally lead to products which are more effective than similar but unsubstituted compounds. Thus the condensation product obtained from xylene sulfonic acid is more effective for present purposes than the one obtained from the simpler benzene derivative. But whereas condensation products prepared from alkylated compounds are especially desirable for use in the broader aspects of this invention, they may be objectionable for some purposes because, they promote the formation of foam in the wet concrete. Materials made from aromatic compounds which are free from substituting alkyl groups have substantially no tendency to cause foam formation; and the products obtained by the reaction of naphthalene sulfonic acid with formaldehyde are specifically recommended for use in a preferred form of this invention where the tendency to produce foam is objectionable.

Whereas I commonly use and particularly recommend the use of the sulfonic acids in the form of their sodium salts, any salt or derivative which is soluble in the aqueous environment of wet concrete, or the free acids may be employed. Thus, for example, the calcium salt of the product resulting from the condensation of beta-naphthalene sulfonic acid with formaldehyde is sufficiently soluble for present purposes and may sometimes be used with advantage because it is cheaper to prepare and is quite compatible with hydraulic cement which itself normally contains water-soluble calcium salts. I wish it to be understood, however, that the expression "water soluble cement-dispersing agent" I intend to denote a cement-dispersing agent which is soluble in the aqueous environment of wet concrete; and the generic term "derivative" I intend to comprise the chemical class of compounds known as salts.

Agents operative for the purposes of this invention are not restricted, however, to aromatic sulfonic acids or their derivatives. I have found that other materials of widely different chemical composition are capable of producing the desired result. Thus, for example, certain bark extracts which occur in commerce under the name of saponin are adapted to some of my purposes, for example, where a tendency to produce foam is not undesirable. Care should be taken in their selection, however, to choose only products which are of requisite purity and are as free as possible from extraneous colloidal materials, for such impurities, like many organic compounds, frequently exercise an adverse influence on the compressive strength of concrete.

In the practice of my invention I generally use one to three parts of the agent for every 1,000 parts of hydraulic cement. It may be added in a dry, finely powdered condition to the hydraulic cement, or it may be dissolved in the gauging water used in mixing concrete with substantially equivalent results; but I prefer the former procedure. When the agent is added to the dry cement, it is convenient to premix it with ground cement or other finely divided material, such as gypsum, in a master batch before admixing it with the bulk of the hydraulic cement. This facilitates and insures a uniform distribution of the active ingredient through the cement. When the material is incorporated into the cement in the dry condition, however, care must be taken to select an agent which is not objectionably deliquescent and consequently likely to result in undesirable caking of the finely powdered cement, or which is likely to invite mold or bacterial growth. The properties of some of my agents which render practically feasible their combination in the dry condition with dry hydraulic cement constitute very valuable advantages of preferred forms of this invention. Substances chosen from the defined class of aromatic sulfonic acids and their derivatives are especially advantageous in the foregoing respects; and I specifically recommend for use in the dry condition materials prepared by the condensation of naphthalene sulfonic acid with formaldehyde in accordance with the detailed procedure given herein. Those skilled in the art, however, will be able to select from my broad class of dispersing agents other substances which are adapted to be mixed with cement in the dry condition.

Cements differing in composition or fineness of subdivision require different quantities of the effective agent to produce the optimum result. For most purposes 1½ parts of the agent for every 1,000 parts of cement will give the best results; but the use of a relatively large quantity of the preferred agent such as 20 parts for 1,000 parts of cement actually defeats its own purpose and should therefore be avoided. The minimum quantity of agent required to yield the optimum effect for present purposes is easily determined by making several trial mixes of concrete using different percentages, e. g. 0.05%, 0.10%, 0.15%, 0.20%, 0.25%, and 0.30%, of the active agent on the cement but under otherwise identical conditions, and observing the fluidity or plasticity of the resulting wet mixtures. The minimum quantity of agent required to produce the maximum plasticity of the mix should be selected. Any agent which is capable of improving the plasticity of concrete, as the effect of more uniform distribution of the cement particles, in this test I designate as a "cement-dispersing agent." Within practical limits, the results obtained in the test are independent of the concrete mix chosen for the determination; but I generally prefer to make the determination on one of the usual mixes, e. g. 1:2:4, and with a quantity of water adapted to yield, in the absence of any of these agents, a slump of from 2½ to 5 inches. This test is useful also to determine the relative value for the purpose of this invention of any compound coming within the chemical classes above mentioned or any other compound useful as a dispersing or disaggregating agent in improving the properties of concrete.

Concretes prepared to given water ratios in accordance with this invention are more plastic than otherwise similar wet concretes and possess in the hardened state compressive strengths at least equal to those which would obtain in the absence of these agents, except during the very early stages, i. e. at the one- and three-day test periods, when the increased plasticity sometimes delays in small measure the development of strength; but any reduction in strength obtaining at these early periods is at least fully offset in the later stages of the hardening or strength-producing process, i. e. at the 28-day period and later. And whereas some of these agents afford, at the longer test periods, only such strengths as would prevail in their absence under otherwise identical conditions, others, such as material prepared according to the detailed example given previously herein, yield with some cements, more particularly those that are finely ground, strengths substantially in excess of those which would normally result; and these abnormal strength increases which may amount to 10–20% of the whole are persistant and constitute special advantages of a preferred form of my invention. Dispersing agents which provide concretes possessing ultimate (i. e. at the 28-day period and later) compressive strengths at least substantially equal to those which would obtain in the absence of the agent under otherwise exactly identical conditions I refer to as having no adverse influence on the compressive strength of concrete.

Concretes prepared to given plasticities with the aid of this invention from fixed quantities of cement and aggregates possess at once greater strength, durability, and waterproofness than otherwise similar materials mixed to the same plasticities from corresponding proportions of cement and aggregates. My discovery makes possible the preparation of concrete of any assigned plasticity with 5–15% less mixing water—depending on the effective agent, the concrete mix, and the hydraulic cement employed—than is necessary in the absence of the active ingredient; and, as stated in the preceding paragraph, the concrete possesses the improved compressive strength obtained by the reduction in mixing water, and, in preferred cases, even higher strengths. Thus, such concretes prepared to given plasticities according to this invention have in the hardened state up to 40% higher compressive strengths at various test periods than otherwise similar materials prepared to like consistencies but with necessarily larger quantities of mixing water. Similarly, although of incidental value, test briquettes made under this specification generally possess approximately 10% more tensile strength than that prepared to like plasticity in the wet state without one of my agents. Likewise, improvement of the modulus of rupture or beam strength of the order of 15–25% as compared with material derived from wet concrete of like plasticity and otherwise similar composition but untreated according to the present invention is secured. But for many purposes perhaps the greatest advantages possessed by concrete made hereunder to a given plasticity are its superior density, watertightness, and durability. All these desirable properties follow as corollaries of the reduced quantity of mixing water.

From the foregoing description it will be obvious to those skilled in the art that where it is desired to adhere to a given water ratio, i. e. a predetermined strength in hardened material, and a given plasticity (slump) in the wet state, the present invention permits the use of a leaner mix than is otherwise possible with its consequent well known advantages. Thus, with well graded sound aggregate for the ordinary 1:5 mix it is possible to substitute a 1:5¾ mix, and for the well known 1:6 mix, a 1:6¾ mix without sacrifice of either strength or plasticity.

This invention is applicable not only to the ordinary Portland cements but also to cements that have been ground to a superior degree of fineness. Such more finely ground cements are particularly responsive to the treatment. They permit a larger reduction in the quantity of mixing water essential to produce concrete of given plasticity and yield concretes of markedly superior compressive strengths. By treating a cement of superior fineness in accordance with this invention, it is possible to produce cements from ordinary Portland cement clinker which give concretes fully equal in compressive strength to those obtained according to the existing practice from present early strength cements.

The process and product of this invention may be used with advantage together with the common concrete admixtures such as diatomaceous earth which is employed to improve the consistency of concrete, heavy metal stearates, oleates, etc., which are added to concrete to make it shed water, and calcium chloride which is added to concrete to accelerate its early development of strength. These materials in no way interfere with the advantageous function of the herein described agents: each ingredient performs its own advantageous function in the presence of the other.

The term "concrete" as employed herein is used in a broad generic sense and means, unless otherwise indicated, initially plastic and/or finally hardened compositions prepared from the ingredients, water, hydraulic cement, and aggregates such as sand, gravel, crushed stone, coke, asbestos etc. or other bulking materials; and the term "structural concrete" designates a concrete which contains a substantial proportion of coarse aggregates i. e. aggregates which measure one-half inch or more, as distinguished from concrete, or mortar as it is sometimes called, which contains only fine aggregates. The term "hydraulic cement" refers to the finely divided hydratable complex silicates and aluminates which are commonly used for structural purposes and which either occur in nature or comprise calcining mixtures of argillaceous and calcareous materials, e. g. Portland cement.

It should be understood that the present disclosure is for the purpose of illustration only, and that this invention includes all modifications and equivalents which fall within the scope of the appended claims.

I claim:

1. The method of increasing the plasticity of a cement concrete mix which consists in increasing the number of discrete particles available for hydration by dispersing the individual cement particles throughout the aqueous mass by the addition of a cement dispersing agent.

2. The method of increasing the plasticity of a cement concrete mix which consists in increasing the number of discrete particles available for hydration by dispersing the individual cement particles throughout the aqueous medium by the addition of a water soluble cement dispersing agent.

3. The method of increasing the plasticity of a cement concrete mix which consists in increasing the number of discrete particles available for hydration by dispersing the individual cement particles throughout the aqueous medium by the addition of a heat-resistant cement-dispersing agent.

4. The method of increasing the plasticity of a cement concrete mix which consists in adding a water soluble cement-dispersing agent, thereby preventing the formation of agglomerations of cement particles in the aqueous medium or breaking up any such agglomerations which may have already formed and thereby increasing the number of discrete particles available for hydration.

5. The improved cement in which the cement particles have by the presence of a cement dispersing agent been rendered mutually repellant to each other when in the aqueous medium of a suitable concrete mix whereby the number of discrete particles therein available for hydration is increased.

6. The combination of hydraulic cement and a water soluble cement dispersing agent capable of preventing the formation of agglomerations of cement particles in the aqueous medium of a suitable cement concrete mix or of breaking up any such agglomerations which may have already been formed and thereby of increasing the number of discrete particles available for hydration.

7. The combination of dry hydraulic cement and intimately admixed therewith a water soluble dispersing agent which is substantially non-foaming and is capable of preventing the formation of agglomerations of cement particles in an aqueous medium and of dispersing any which may have been already formed and thereby of increasing the number of discrete particles available for hydration.

8. The combination of dry hydraulic cement and intimately admixed therewith a non-deliquescent dispersing agent which is substantially non-foaming and is capable of preventing the formation of agglomerations of cement particles in an aqueous medium and of dispersing any which may have been already formed and thereby of increasing the number of discrete particles available for hydration.

9. The combination of dry hydraulic cement and intimately admixed therewith a heat resisting dispersing agent which is substantially non-foaming and is capable of preventing the formation of agglomerations of cement particles in an aqueous medium and of dispersing any which may have been already formed and thereby of increasing the number of discrete particles available for hydration.

10. The combination of dry hydraulic cement and intimately admixed therewith a water soluble, non-deliquescent, heat resisting dispersing agent which is substantially non-foaming and is capable of preventing the formation of agglomerations of cement particles in an aqueous medium and of dispersing any which may have been already formed and thereby of increasing the number of discrete particles available for hydration.

11. The improved cement in which the cement particles have, by the presence of an organic dispersing agent, been rendered mutually repellent to each other when in the aqueous medium of a suitable concrete mix whereby the number of discrete particles therein for hydration is increased.

12. The combination of hydraulic cement and a water soluble cement dispersing agent capable of preventing the formation of agglomerations of cement particles in the aqueous medium of a suitable concrete mix or of breaking up any such agglomerations which may have been already formed and thereby of increasing the number of discrete particles available for hydration, said dispersing agent being present in amount less than one per cent of the cement.

13. As a new article of manufacture, a dry cement having mixed therewith a dispersing agent and having the physical characteristic that when in an aqueous medium the particles disperse substantially completely.

14. The process of preparing concrete which comprises mixing cement, aggregates, and water in the presence of a soluble compound obtained by condensing formaldehyde with an aromatic sulfonic acid.

15. The process of preparing concrete which comprises mixing cement, aggregates, and water in the presence of a soluble compound having a general chemical structure characterized by a plurality of aromatic nuclei joined to an aliphatic nucleus.

16. The process of preparing concrete which comprises mixing cement, aggregates, and water in the presence of a soluble sulfonic acid compound having a general chemical structure characterized by a plurality of aromatic nuclei joined to an aliphatic nucleus.

17. The process of preparing concrete which comprises treating cement with a soluble salt of a compound obtained by condensing formaldehyde with an aromatic sulfonic acid and thereafter mixing the treated cement with water and aggregates.

18. The process of preparing concrete which comprises mixing cement, aggregates, and water in the presence of a soluble salt of a sulfonic acid compound having a general chemical structure characterized by a plurality of polynuclear aromatic nuclei joined to an aliphatic nucleus.

19. As a new composition of matter, concrete which contains a soluble compound obtained by condensing formaldehyde with an aromatic sulfonic acid.

20. As a new composition of matter, dry hydraulic cement which contains a soluble compound obtained by condensing formaldehyde with an aromatic sulfonic acid.

21. As a new composition of matter, concrete which contains a soluble compound obtained by condensing formaldehyde with a polynuclear aromatic sulfonic acid.

22. As a new composition of matter, dry hydraulic cement which contains a soluble compound obtained by condensing formaldehyde with a polynuclear aromatic sulfonic acid.

23. As a new composition of matter, concrete which contains a soluble compound having a general chemical structure characterized by a plurality of aromatic nuclei joined to an aliphatic nucleus.

24. As a new composition of matter, dry hydraulic cement which contains a soluble compound having a general chemical structure characterized by a plurality of aromatic nuclei joined to an aliphatic nucleus.

25. The process of preparing concrete which comprises mixing cement, aggregates, and water in the presence of a soluble compound obtained by condensing formaldehyde with a sulfonic acid of the naphthalene series.

26. The process of preparing concrete which comprises mixing cement, aggregates, and water in the presence of a soluble sulfonic acid derivative of a compound having at least two naphthalene rings joined to the same carbon atom of an aliphatic nucleus.

27. The process of preparing concrete which comprises mixing cement, aggregates, and water in the presence of a soluble salt of a compound obtained by condensing formaldehyde with an alkylated naphthalene sulfonic acid.

28. The process of preparing concrete which comprises mixing cement, aggregates, and water in the presence of a soluble salt of a compound obtained by condensing formaldehyde with a sulfonic acid of the naphthalene series.

29. As a new composition of matter, concrete containing a soluble sulfonic acid derivative of a compound having at least two naphthalene rings joined to the same carbon atom of an aliphatic nucleus.

30. As a new composition of matter, dry hydraulic cement containing a soluble sulfonic acid derivative of a compound having at least two naphthalene rings joined to the same carbon atom of an aliphatic nucleus.

31. As a new composition of matter, dry hydraulic cement containing a soluble compound obtained by condensing formaldehyde with a sulfonic acid of the naphthalene series.

32. As a new composition of matter, concrete containing a soluble compound obtained by condensing formaldehyde with an alkylated naphthalene sulfonic acid.

33. As a new composition of matter, dry hydraulic cement containing a soluble salt of a compound obtained by condensing formaldehyde with an alkylated naphthalene sulfonic acid.

34. As a new composition of matter, concrete containing a soluble compound obtained by condensing substantially one mol of formaldehyde with substantially two mols of beta-naphthalene sulfonic acid.

35. As a new composition of matter, dry hydraulic cement containing a soluble salt of a compound obtained by condensing substantially one mol of formaldehyde with substantially two mols of beta-naphthalene sulfonic acid.

GEORGE R. TUCKER.